No. 734,792. PATENTED JULY 28, 1903.
H. M. ALBEE.
ENGRAVING OR CARVING MACHINE.
APPLICATION FILED DEC. 5, 1899.
NO MODEL. 14 SHEETS—SHEET 1.
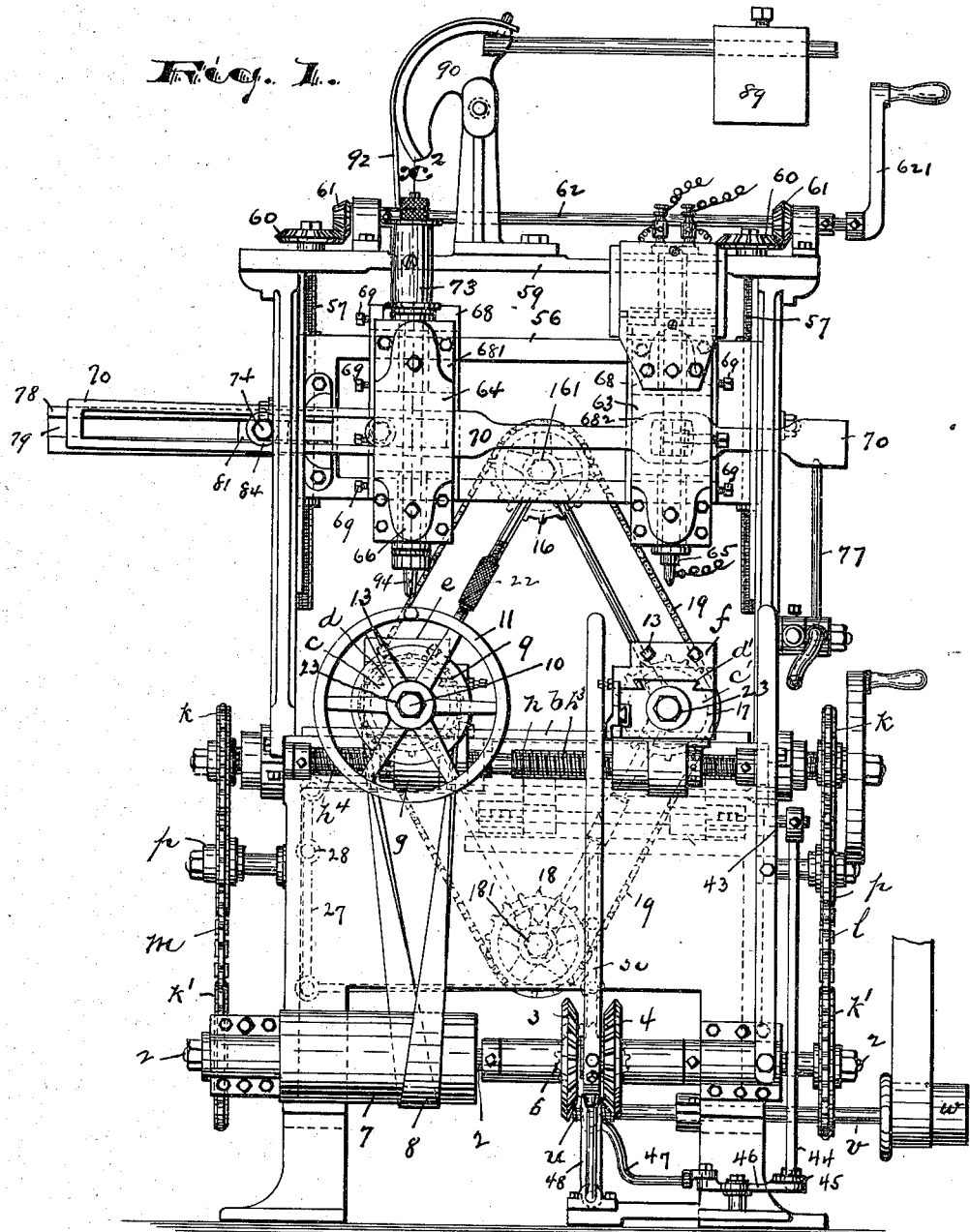
WITNESSES: INVENTOR:
Alfred R. Krausse. Honestus M. Albee,
Russell M. Everett. BY
Drake & Co.
ATTORNEYS.

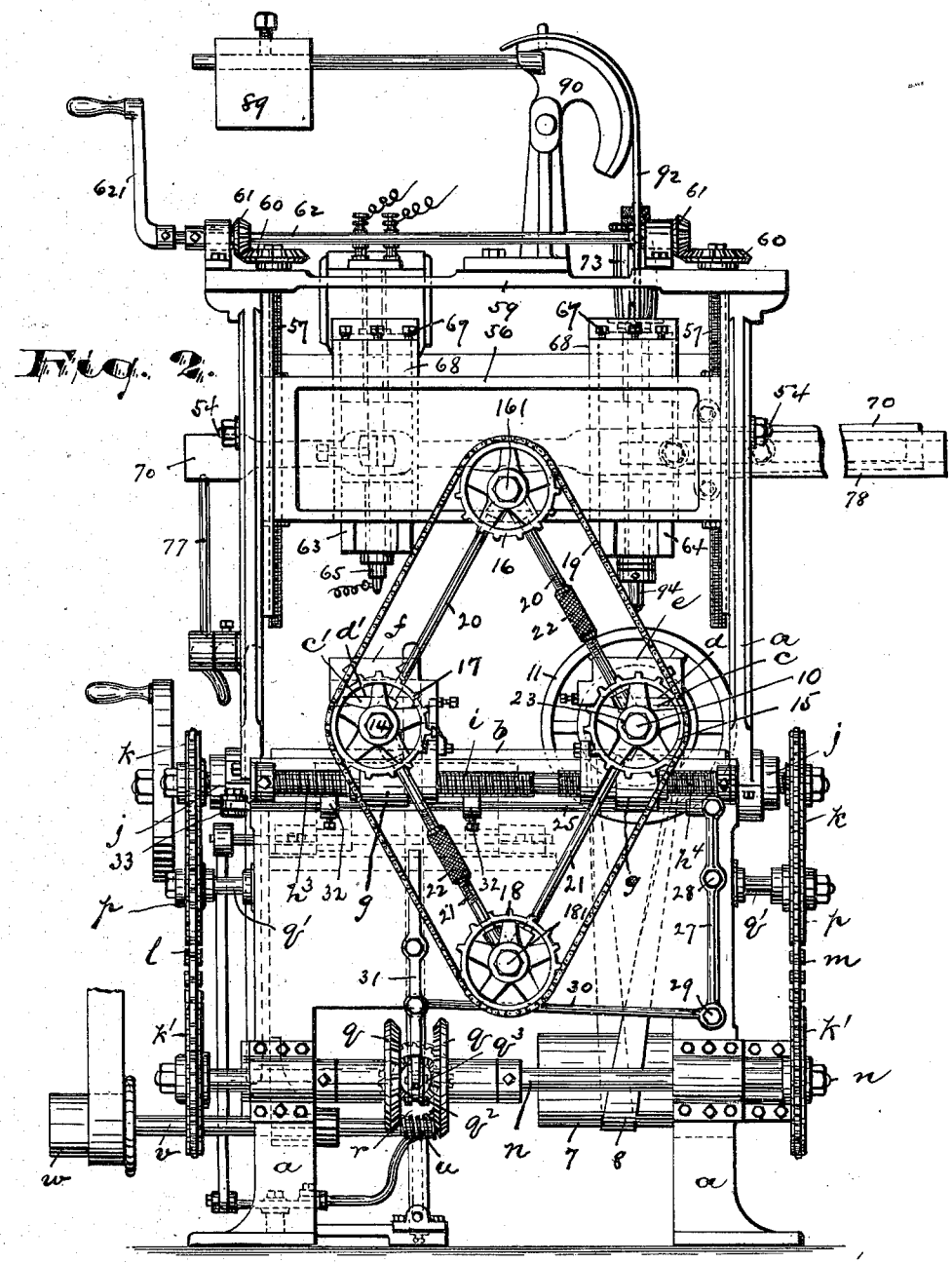

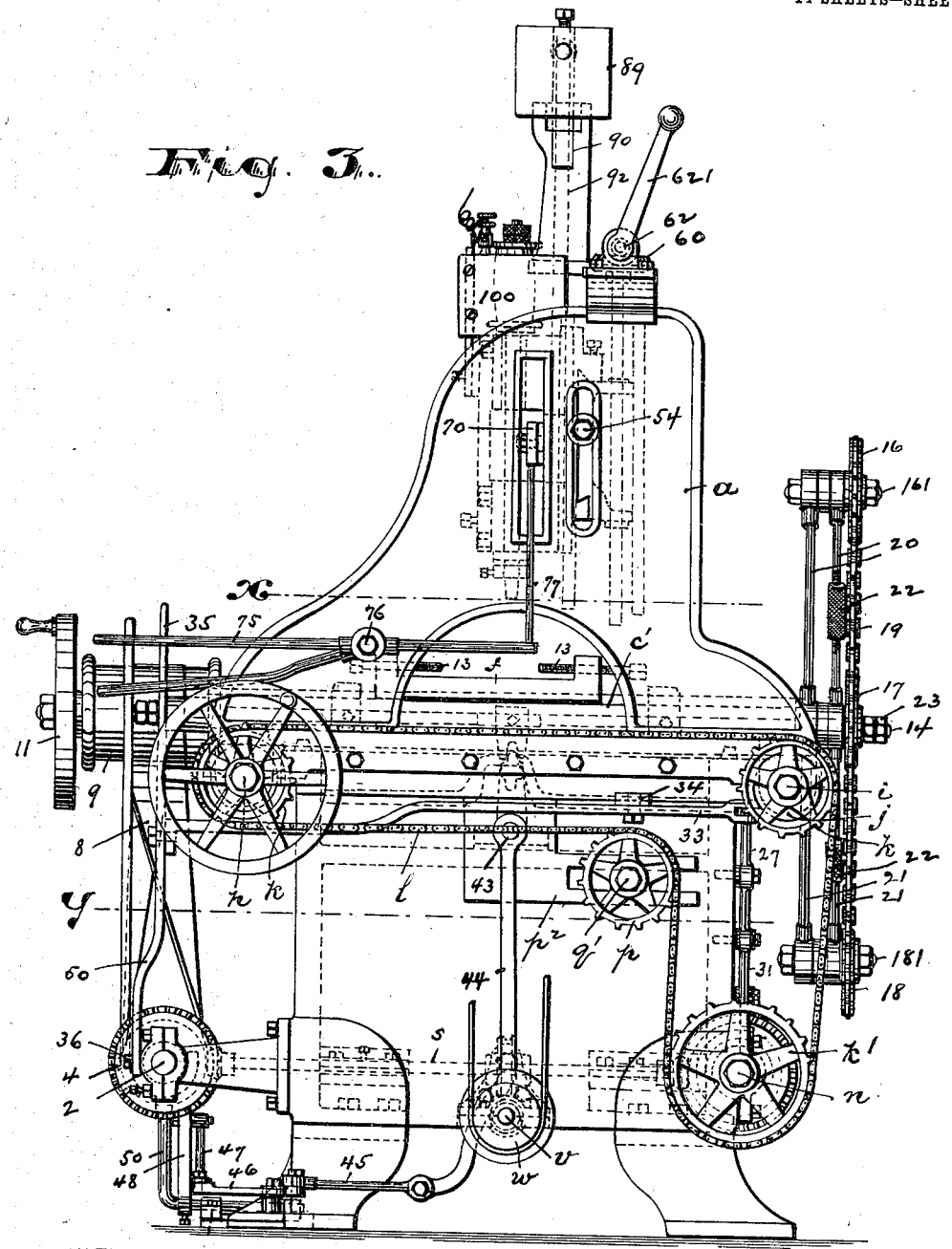

No. 734,792. PATENTED JULY 28, 1903.
H. M. ALBEE.
ENGRAVING OR CARVING MACHINE.
APPLICATION FILED DEC. 5, 1899.
NO MODEL. 14 SHEETS—SHEET 4.
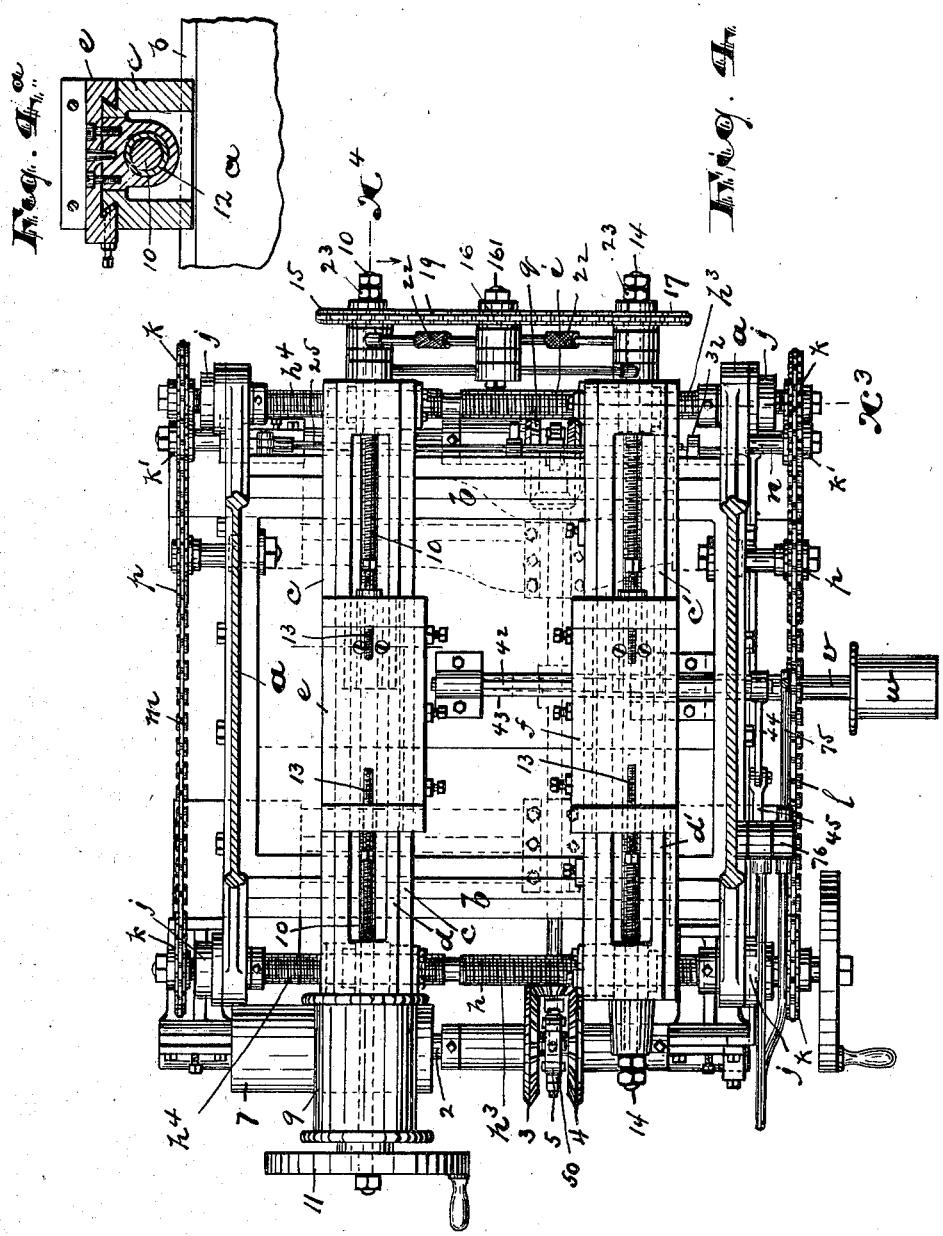
WITNESSES:
INVENTOR:
Honestus M. Albee,
BY
ATTORNEYS.

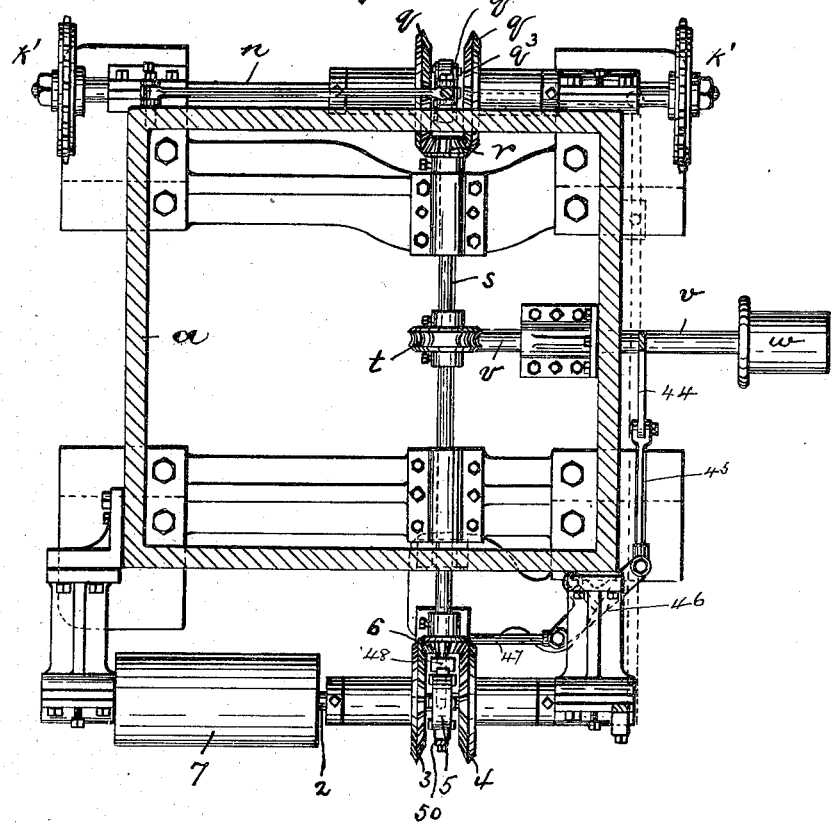

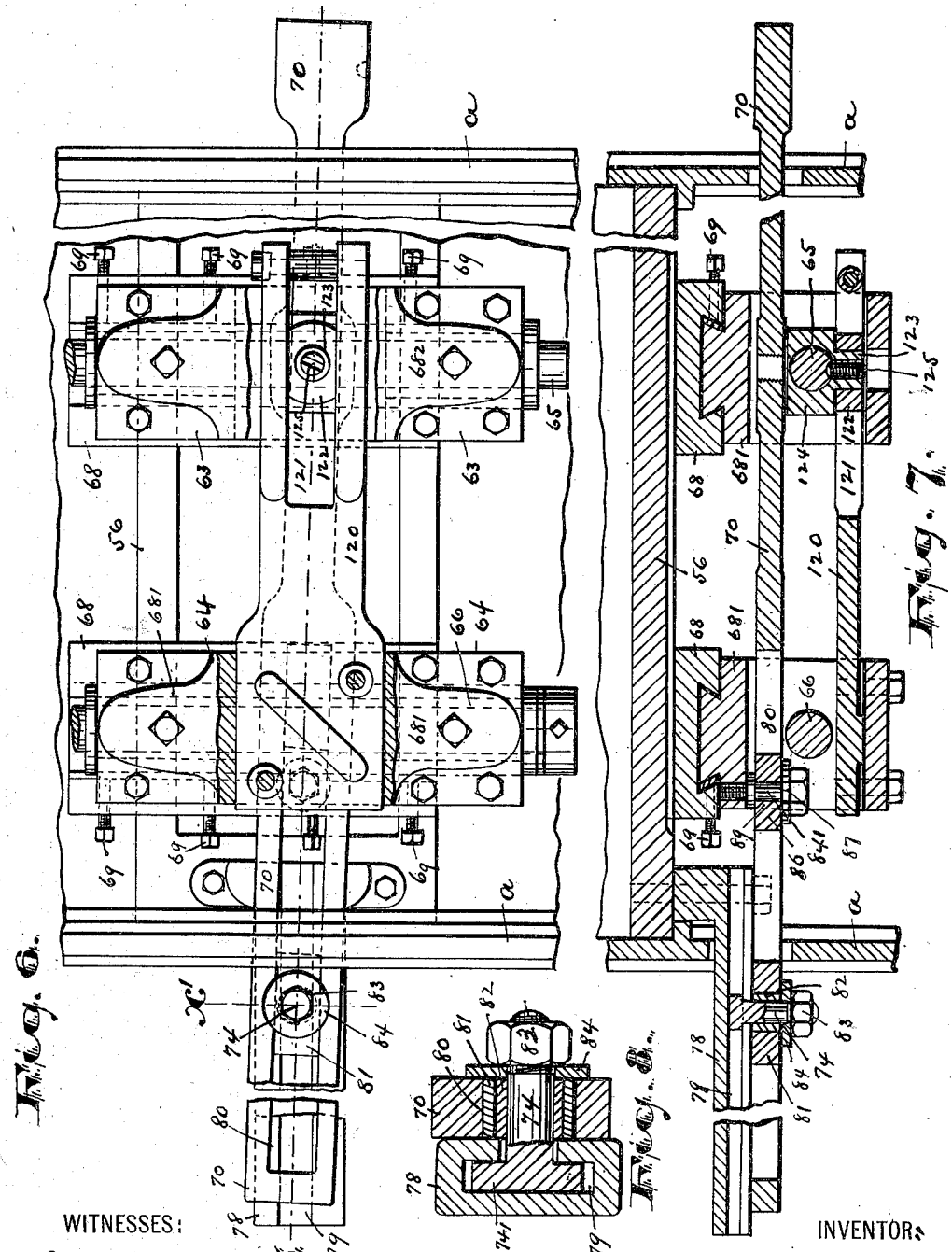

No. 734,792. PATENTED JULY 28, 1903.
H. M. ALBEE.
ENGRAVING OR CARVING MACHINE.
APPLICATION FILED DEC. 5, 1899.
NO MODEL. 14 SHEETS—SHEET 7.
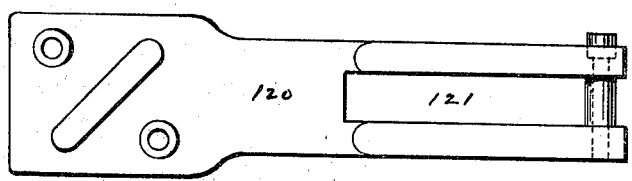
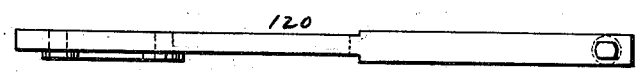
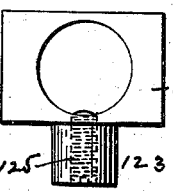 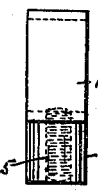 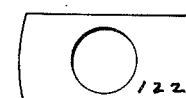 
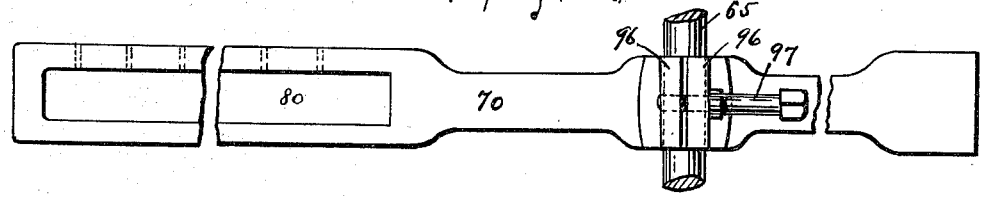
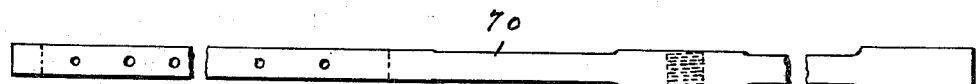
WITNESSES: INVENTOR:
Alfred R. Krouse. Honestus M. Albee,
Russell M. Everitt. BY
Drake G.
ATTORNEYS.

No. 734,792. PATENTED JULY 28, 1903.
H. M. ALBEE.
ENGRAVING OR CARVING MACHINE.
APPLICATION FILED DEC. 5, 1899.
NO MODEL. 14 SHEETS—SHEET 8.
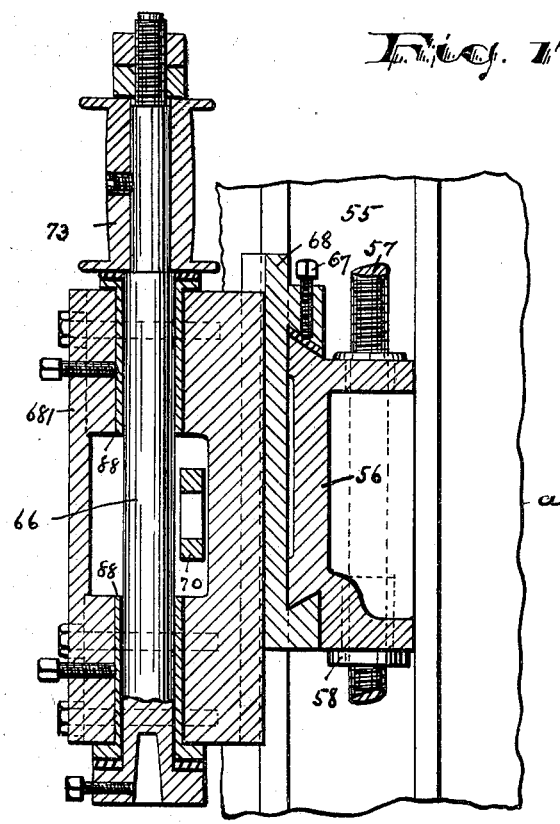
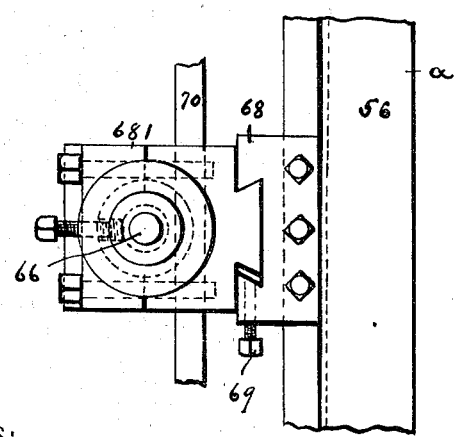
WITNESSES: INVENTOR
Alfred R. Krousse. Honestus M. Albee,
Russell M. Everett. BY
Drake & Co.
ATTORNEYS.

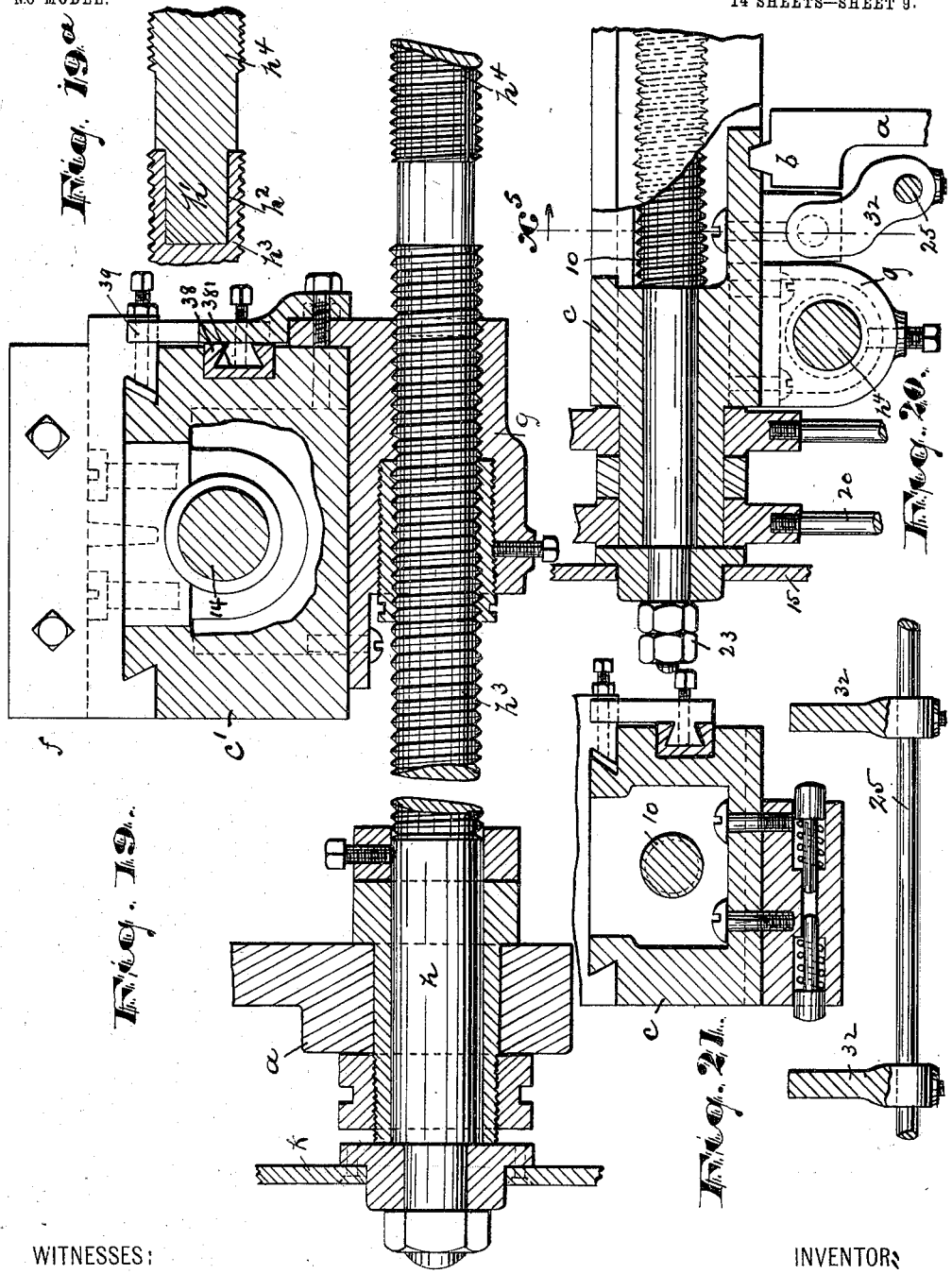

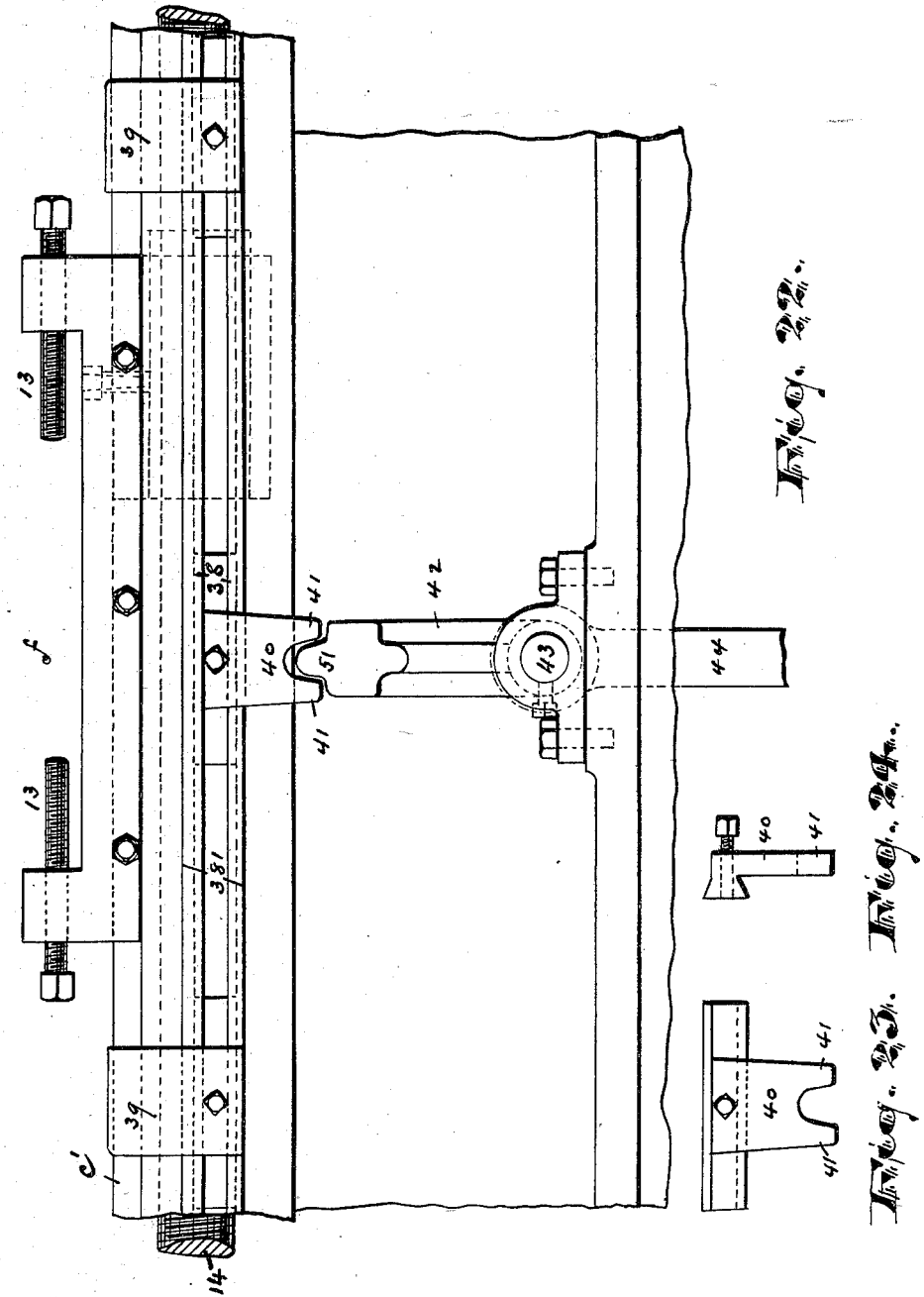

No. 734,792. PATENTED JULY 28, 1903.
H. M. ALBEE.
ENGRAVING OR CARVING MACHINE.
APPLICATION FILED DEC. 5, 1899.
NO MODEL. 14 SHEETS—SHEET 11.
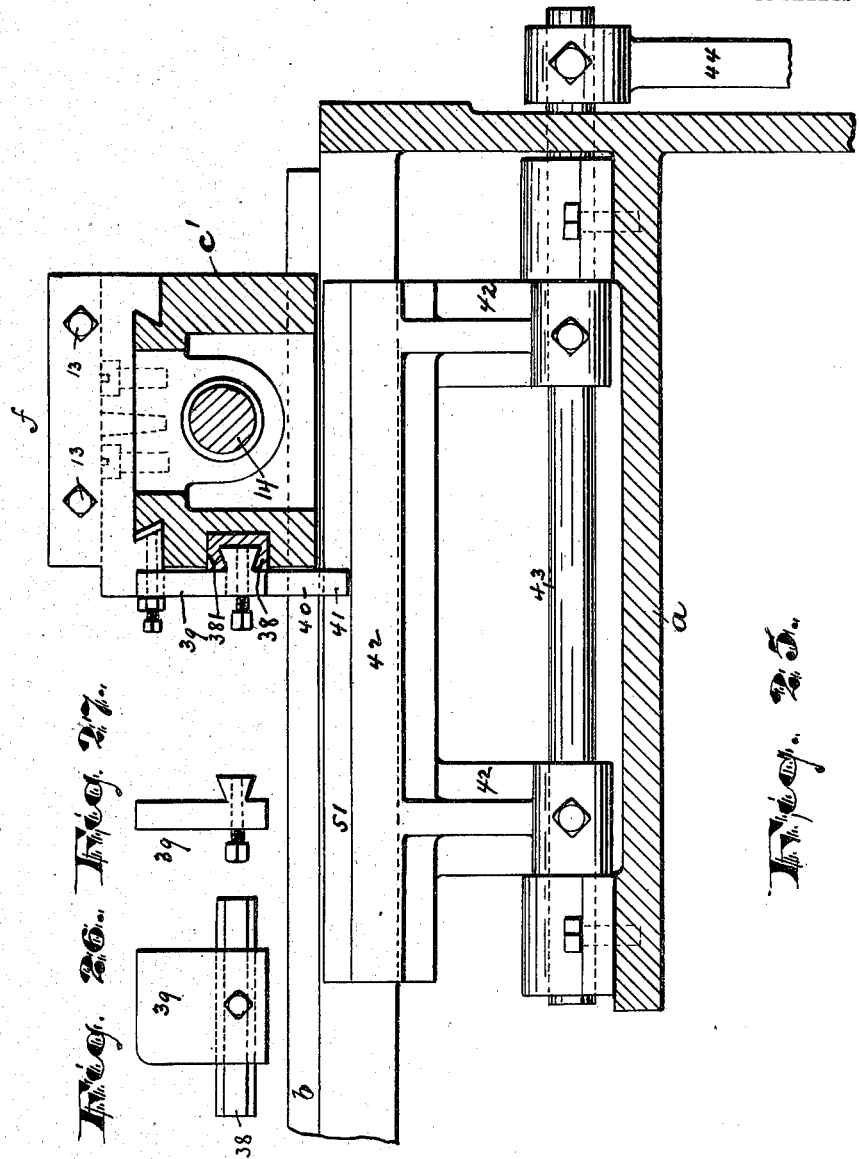
WITNESSES: INVENTOR:
Alfred R. Krouse. Honestus M. Albee,
Russell M. Everett. BY
Drake & Co.
ATTORNEYS.

No. 734,792. PATENTED JULY 28, 1903.
H. M. ALBEE.
ENGRAVING OR CARVING MACHINE.
APPLICATION FILED DEC. 5, 1899.
NO MODEL. 14 SHEETS—SHEET 12.
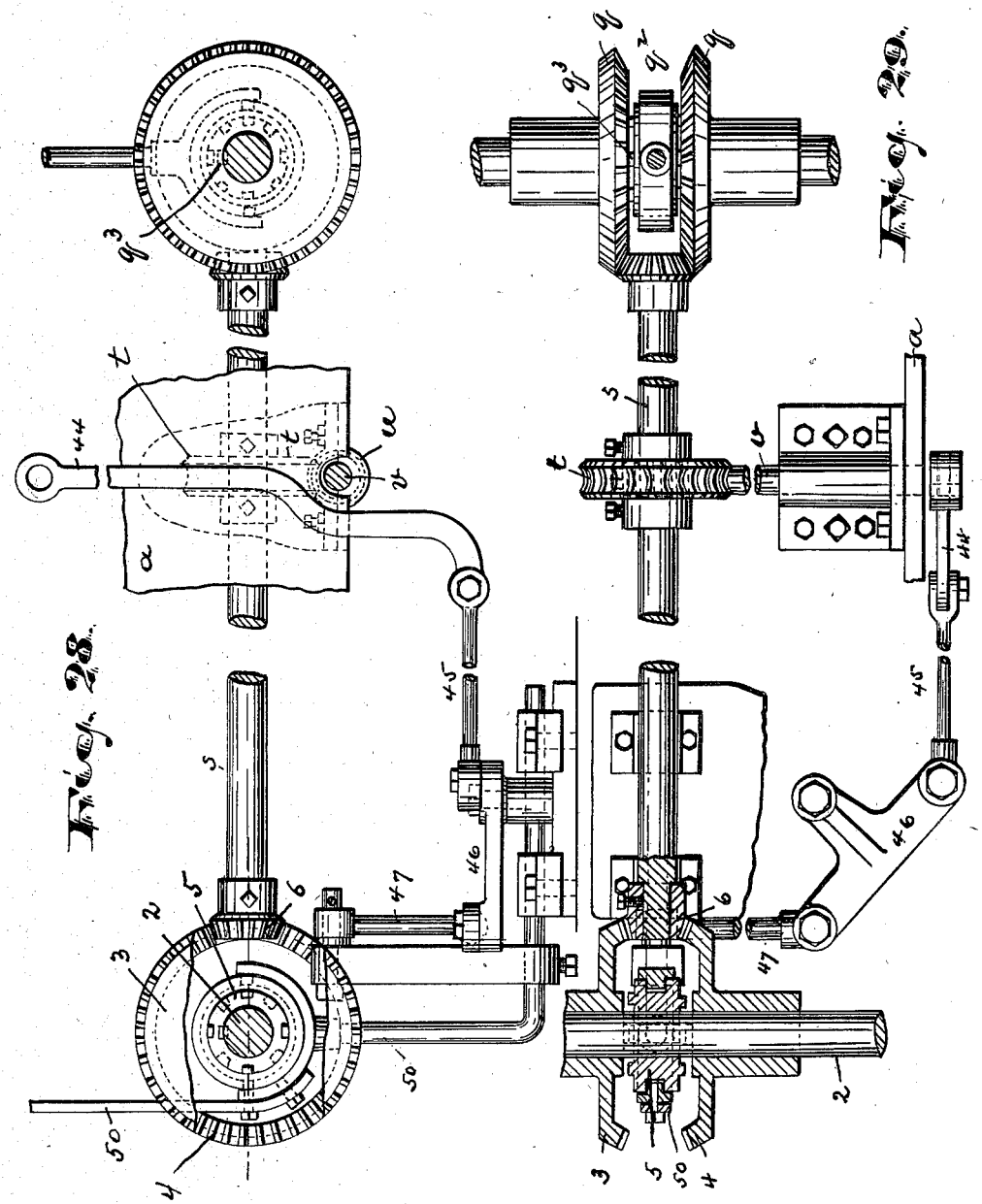
WITNESSES: INVENTOR:
Honestus M. Albee,
BY
Draket Co.
ATTORNEYS

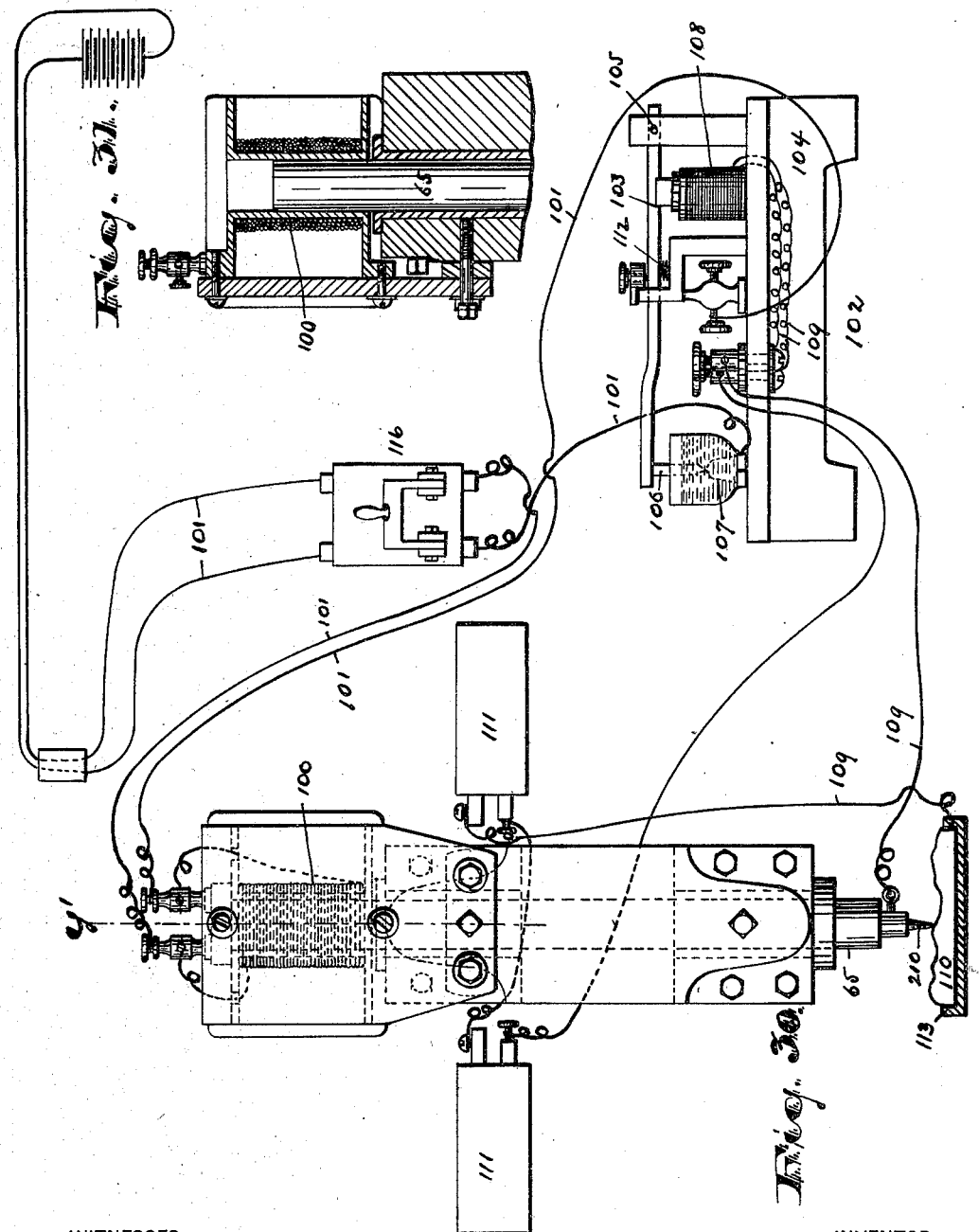

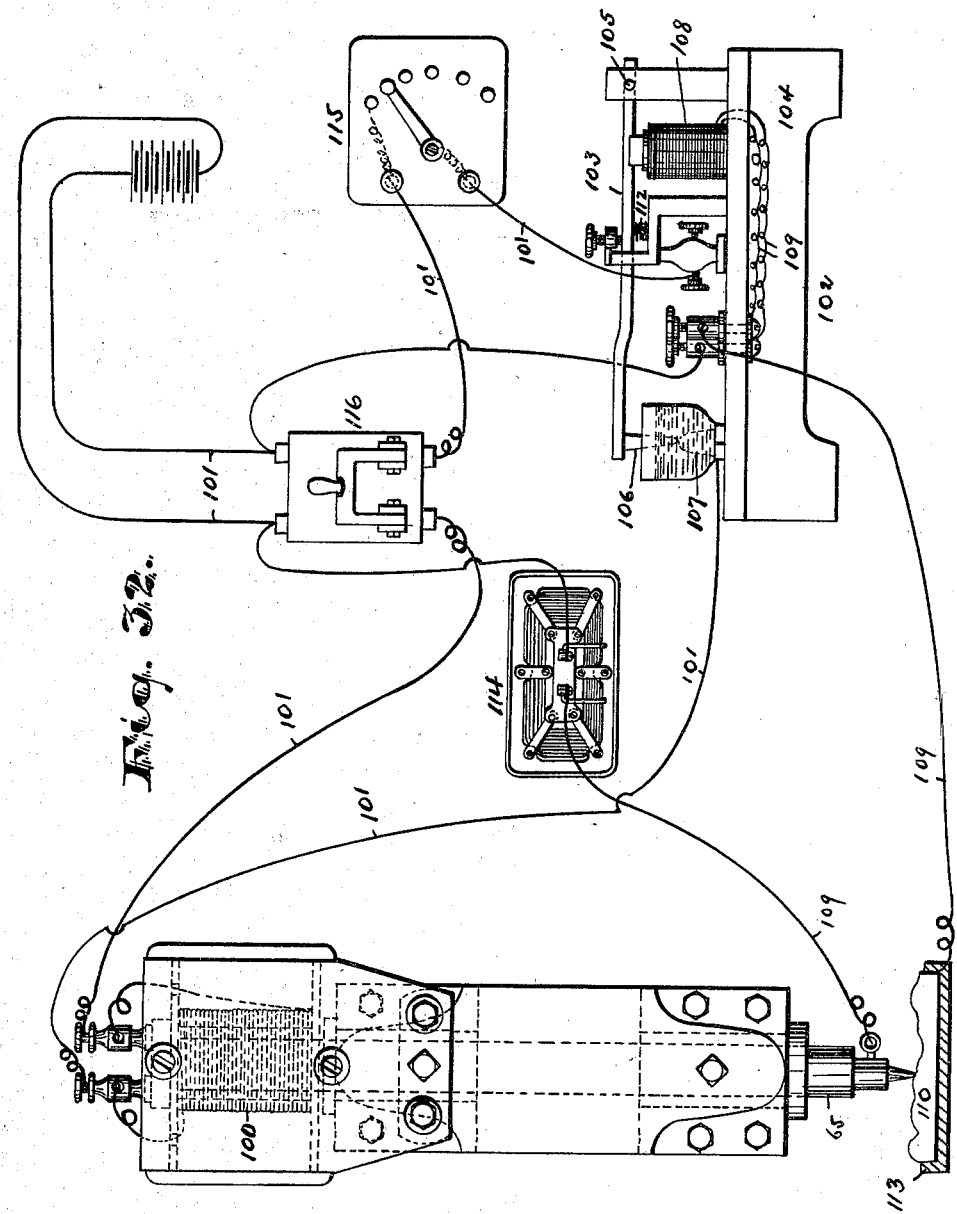

No. 734,792. Patented July 28, 1903.

UNITED STATES PATENT OFFICE.

HONESTUS M. ALBEE, OF NEWARK, NEW JERSEY, ASSIGNOR OF TWO-THIRDS TO WILLIAM H. KING, OF NEWARK, NEW JERSEY, AND FRANK H. LA PIERRE, OF EAST ORANGE, NEW JERSEY.

ENGRAVING OR CARVING MACHINE.

SPECIFICATION forming part of Letters Patent No. 734,792, dated July 28, 1903.

Application filed December 5, 1899. Serial No. 739,242. (No model.)

*To all whom it may concern:*

Be it known that I, HONESTUS M. ALBEE, a citizen of the United States, residing at Newark, in the county of Essex and State of New Jersey, have invented certain new and useful Improvements in Engraving or Carving Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The general objects of this invention are to facilitate the work and reduce the cost of carving metal, and more particularly steel, in the art of die-sinking or other useful arts; to secure a more perfect reproduction of a given model, both in proportions and execution of details; to reduce the labor and attention or supervision required while the machine is in operation, and thus render the machine more perfectly automatic; to reduce the pressure of the tracing-point upon the model while carving, and thereby to preserve the surface of said model from injury, especially should it be made of soft or otherwise perishable material, and more particularly to enable electrotypes to be employed as models in the automatic carving of steel dies, and to secure other general objects and results, some of which may be hereinafter referred to.

Some of the specific objects and advantages will be described in connection with the description of the working parts.

The invention consists in the improved engraving or carving machine and in the arrangements and combinations of parts of the same, all substantially as will be hereinafter set forth and finally embraced in the clauses of the claim.

The invention generally comprises a rotary engraving or carving tool, a rotary tracer or point, said parts being connected and arranged to work together, the vertical movements of the tracer governing the vertical movements of the engraving or carving tool, so that as the tracer rises and falls as it traverses the elevations and depressions of the pattern the carving-tool correspondingly rises and falls to reproduce the design, the parts being relatively adjustable to enable the reproduction to be enlarged or reduced from the original pattern and the pattern and "work" being movable together on suitable tables or supports adapted to reciprocate both laterally and longitudinally of the machine, the horizontal movements of the work table or support being increased or diminished in the pattern, table, or support in correspondence with the variations of vertical movement of the carving-tool and tracer, and, furthermore, the tracer being given an exceedingly quick vertical reciprocation by electrical means, whereby the said tracer alternately makes and breaks contact with the pattern with such exceeding rapidity as to virtually cause a smooth and even movement over the irregular surface of the pattern as the latter moves horizontally with its table or support. These even movements are accomplished at various elevations, so that the tracer moves with the same smoothness and quality of action over the high projections of the pattern as over the low surfaces.

Specifically the invention embraces numerous detail improvements to enable the work to be performed with practical results of great perfection and the production in steel to have the peculiar artistic merit of the original.

Referring to the accompanying drawings, in which like characters of reference indicate corresponding parts in each of the several figures, Figure 1 is a front elevation of the improved device. Fig. 2 is a rear elevation, and Fig. 3 is a side elevation, of the same. Fig. 4 is a section taken through line $x$ of Fig. 3. Fig. 4$^a$ is a detail section taken through the screw-shaft bearing of the work-carrier slide. Fig. 5 is a section taken through line $y$ of Fig. 3. Fig. 6 is a front elevation showing a portion of the bed-frame, a lever fulcrumed thereon, and certain tool-carriers in connection with said lever. Fig. 7 is a section on line $z$, and Fig. 8 is a section on line $x'$ of Fig. 6. Fig. 9 is a detail front elevation, and Fig. 10 is a detail plan, of the lever before referred to. Figs. 11 and 12 are respectively a front elevation and a plan of an attachment sometimes employed in connection with the said lever and tool-carriers. Figs. 13 and 14 are respectively a plan and side elevation of a certain shaft-bearing block adapted to operate in connection with said attachment; and Figs. 15 and 16 are front and side views, respectively, of a coöperating sliding block. Fig. 17 is a section taken at line $x^2$ of Fig. 1. Fig. 18 is a detail plan of the parts shown in Fig. 17. Fig. 19 is an enlarged sectional detail taken through line $x^3$ of Fig. 4. Fig. 19$^a$ is a longitudinal section of a portion of a sectional shaft hereinafter referred to, and Fig. 20 is a sectional view taken through line $x^4$ of said Fig. 4. Fig. 21 is a section taken through line $x^5$ of Fig. 20. Fig. 22 is an enlarged detail view of a portion of the model or pattern holder. Figs. 23 and 24 are respectively detail front and side views of a certain arm thereof. Fig. 25 is a sectional detail showing the parts last referred to from the front, the front and rear and one side of the frame being removed; and Figs. 26 and 27 are front and side views of a certain stop-arm of said parts. Figs. 28 and 29 illustrate in side elevation and plan certain driving mechanism in detail, and Fig. 30 shows in detail an electromagnetic attachment for governing the movements of a tracer of the improved machine; and Fig. 31 is a section taken at line $y'$ of Fig. 30, showing more clearly the relation of the solenoid to the tracer-shaft. Fig. 32 is a diagrammatic view of a preferred arrangement of electrical appliances for governing the movements of the tracer.

In said drawings, $a$ indicates a bed or frame of heavy and substantial cast metal suitably constructed to provide bearings for the working parts. About midway of its vertical extension the said frame $a$ provides, near its front and near its rear ends, parallel horizontal slideways $b$ $b$, Figs. 2 and 4, on which are arranged a pair of parallel slides $c$ $c'$, the upper faces of each of which last provide slideways $d$ $d'$, extending at right angles to the first said slideways of the bed or frame. On the slideways $d$ $d'$ are arranged sliding carriers $e$ and $f$, adapted to receive, respectively, the work to be operated upon and the model to be reproduced.

The slides $c$ $c'$ at their opposite ends are each provided with threaded nuts $g$, Figs. 19, 20, fastened to said slides $c$ $c'$ in any suitable manner and adapted to receive pairs $h$ $i$ of screw-shaft sections, the first being at the front and the second at the rear of the machine, disposed adjacent to the slideways $b$ $b$, preferably near the outer sides thereof and parallel therewith, said pairs $h$ $i$ being arranged in bearings or boxes $j$ of the bed or frame $a$ and adapted to rotate therein to effect a sliding movement of the slides $c$ $c'$ on the slideways $b$. The said sectional pairs $h$ $i$ are each provided with sprocket-wheels $k$, each section having its sprocket-wheel and the sprocket-wheel of one shaft-section being of the same size as the connecting sprocket-wheel of the corresponding section in the opposite pair, so that the connected sections of the said opposite sections move simultaneously and at the same rate of speed. The sections $h^3$ $h^4$ of each of the said pairs rotate independent one of the other, the meeting end $h'$, Fig. 19$^a$, of one of the said sections fitting into a socket $h^2$, formed in the engaging section. The said sections $h^3$ $h^4$ are preferably provided with differently-sized screw-threads, those of one section being, preferably, one-half or other proportion of the size of the threads of the other section, and the connected sections of the opposite pairs having their threads of uniform size. The sprocket-wheels $k$ of the front pair $h$ are connected to the sprocket-wheels of the rear pair $i$ by chains $l$ $m$, said chains being in connection with sprocket-wheels $k'$ of a rear driving-shaft $n$. The said chains $l$ $m$ also intermesh with adjustable idle pulleys $p$, having bearings on sliding studs $q'$, arranged in slideways $p^2$ on the bed plate or frame.

The rear driving-shaft $n$ is provided with two loose beveled gear-wheels $q$ $q$, Figs. 2 and 5, arranged on opposite sides of a peripherally-grooved sliding collar $q^2$, also arranged upon said shaft, the said sliding collar being provided at its opposite sides or ends with clutch-teeth $q^3$, adapted to engage coöperating corresponding clutch-teeth on the contiguous faces of the loose beveled gear-wheels $q$ $q$. The said beveled gear-wheels $q$ are operated continuously in opposite directions by an intermediate beveled gear-wheel $r$, arranged on a shaft $s$, having between its opposite ends a worm-wheel $t$, which intermeshes with a corresponding worm-wheel $u$ on the power-shaft $v$, adapted to receive its power from any suitable source by means of a pulley $w$ or any other power-transmitting devices. By shifting the clutch-collar $q^2$ from one beveled gear-wheel $q$ to the other it is evident that the driving-shaft $n$ will be reversed in direction of movement, as will be understood, the said clutch-collar being prevented from turning independent of said shaft by an ordinary spline $q^3$ or other suitable means. A train of clutch-shifting levers is provided, by means of which the rear clutch-collar $q^2$ is operated from the front of the machine and the rear driving-shaft $n$ thus changed in direction of movement. The said train of clutch-operating levers are provided with suitable means by which the rear clutch is operated automatically to secure the desired reverse movements. The specific construction of the said levers and automatic shifting devices are hereinafter more fully described.

At the front of the machine is a second driving-shaft 2, Figs. 1 and 5, having loose beveled gear-wheels 3 and 4, similar to those above described, with clutch-teeth to receive another sliding clutch-sleeve 5, the said beveled gear-wheels being driven in opposite directions by a beveled pinion 6 on the shaft s, receiving its power from the power-shaft v through worm-wheels t u, before referred to. The shaft 2, between the gear-wheels 3 and 4, is provided with the clutching-sleeve 5, and this is operated by a shifting-lever 50, fulcrumed at 51, Fig. 28, upon the floor or bed-frame in any suitable manner.

The driving-shaft 2 is provided with a pulley 7, by means of which power is transmitted therefrom through a belt 8 and pulley 9 to effect a movement of the work-carier e on the slide c horizontally toward the front or rear of the machine. The said pulley 9 is arranged on a screw-shaft 10, extending from front to rear of the machine, arranged to rotate in bearings of the slide c, and the belt-pulley 7 on the shaft is of considerable axial length, so that the driving-belt 8 may shift laterally on said pulley as the coöperating belt-pulley 9 on the screw-shaft 10 travels with the said screw-shaft with the slideway c toward one side of the machine or the other. I may provide the screw-shaft 10 with a hand-wheel 11, by means of which the said shafts may be turned by hand while adjusting the die or its model prior to applying the mechanical motive power. The sliding work-carrier e is provided with a threaded nut or bearing 12, Fig. 4ª, through which the shaft 10 passes, and on turning axially causes a movement of the carrier on its slideway.

The carrier e is provided with suitable means to receive and hold the die or other metal work undergoing the carving or cutting operations. The model-carrier f is also provided with suitable means to receive and hold the model firmly in position. The holding means may be ordinary set-screws 13 or any other appropriate devices.

Power and motion are transmitted from the die-carrier screw-shaft 10 to the model-carrier screw-shaft 14 by means of interchangeable sprocket-wheels 15 16 17 18 (shown in Fig. 2 with clearness) and a connecting-chain 19, arranged at the rear end of the machine, where the said screw-shafts 10 14 each project rearward from the slides c c' and are provided with upper and lower pairs of pulley-supporting arms 20 20 and 21 21. Said idle-pulley-supporting arms are oppositely inclined and meet at points above and below the horizontal plane of the pulleys 15 17, and at their meeting ends support idle-pulley shafts 161 181, upon which are arranged and secured the idle sprocket-wheels 16 18. The said arms 20 20 21 21 are allowed a limited pivotal action upon the screw-shafts 10 14 and upon the idle-pulley shafts 161 181, and thus as the slides c c and their screw-shafts move on their slideways the said arms are where they connect with the said screw-shafts either spread apart or moved toward one another. The idle sprocket-pulleys and the sprocket-wheels of the screw-shafts are connected by the endless chain 19, so that the power is transmitted from one screw-shaft to the second, and yet there is no interference with the movement of the slides upon their slideways.

To enable the sprocket-wheels to be changed for others of larger or smaller diameter, I prefer to make opposite arms of the parallelogram in threaded sections, connected by turnbuckles 22, so that the opposite sections may be increased in length to take up any slack or looseness of the chain that way be caused by a reduction in the size of the sprocket-wheels employed. The said arms 20 20 21 21 are held on said projecting ends of the screw-shafts, together with the sprocket-wheels, by suitable nuts 23 or in any other appropriate manner. By the construction of parts thus described it will be evident that I can secure a movement of the model and die in two opposite directions, both lengthwise of the machine or toward or from the front or rear thereof and laterally or toward either of the sides thereof, and these movements both laterally and longitudinally may be differential, and thus I may make the model move at a speed higher than the die or work, and, furthermore, by the construction described and by having suitable sizes of screws and sprockets I may secure a cutting or carving action both in the forward and return movements of the carving-cutter, so that there will be no loss of time in the operations of the machine due to ineffective return movements. The power thus transmitted from the shaft 10 to the shaft 14 is effective in turning said shaft 14 in its axial bearings of the slide C', and inasmuch as the model-carrier f is provided with a nut or threaded bearing on or secured thereto said model-carrier is caused to slide on the slideway at the top of said slide, the speed being governed by the size of the thread and of the sprocket-wheels. I prefer to form the threads of the screw-shaft 10 of the work-carrier smaller than the threads on the shaft 14 for the model-carrier, the several parts being proportioned to obtain a rate of speed about one-half in the work-carrier of the speed of the model-carrier, although this proportion may be changed by changing the sizes of the threads and of the sprocket-wheels 15 17, as will be apparent.

The parts last above described relate to the front and rear movements of the model and work. I also obtain corresponding differential movements of the model and work laterally by means of the differently-sized threads on the engaging sections of the sectional shafts $h$ $i$, operated by the sprocket-wheels $k$ $k$, as before referred to. As said sectional shafts rotate under the power of the sprocket-wheels $k$ and chains $l$ $m$, the slides $c$ $c'$ engaged, the first by the shaft-sections $h^4$ with the small thread and the second by the section $h^3$ with the large thread, are each caused to move laterally on the slideways $b$. Thus the carriers $e$ and $f$ move horizontally both toward the front and rear reciprocally and toward the one side of the machine and toward the other reciprocally, so that the carving-tool and tracer employed in connection with the work and pattern, respectively, are caused to traverse the surfaces of said work and pattern, and in connection with the other mechanisms governing the vertical movements to reproduce in the work the outlines and configurations of the pattern, and because of the differential movements the work performed differs in scale from the pattern, being increased or diminished as may be required.

I prefer to govern the traversing movements of the carving-tool, tracer, and carriers automatically, so that when the tracer and tool have passed over the surfaces of the pattern and work in one direction return movements will be immediately effected automatically. To automatically reverse the direction of movement of the carrier $e$ laterally in the slideways $b$, I have arranged at the rear of the machine a longitudinally-movable shaft or rod 25. (Shown clearly in the rear elevation of Fig. 2.) This shaft or rod at one end is in pivotal conection with a lever 27, fulcrumed at 28 on the said bed-frame. Said lever 27 is in turn connected at 29 with a rod 30, pivotally connected with a shifting-lever 31, adapted to engage the clutch-collar $q^2$ and throw it into clutching relation with one or the other beveled gear-wheels $q$.

The shaft or rod 25 is provided with arms or projections 32, adapted to extend into the path of one of the slides $c\ c'$, the said arms 32 being adjustable on said rod 25, and thus said arms 32 may be so placed as that when the carriers have carried the work or the pattern in one direction beyond the limits of effective operation one or the other of said carriers will engage one or the other of said arms 32 and effect a longitudinal movement of the shaft 25 and a corresponding shifting of the clutch-collar and reverse movements of the rear sectional screw-shaft, the front sectional screw-shaft being reversed at the same time because of the chain and sprocket-wheel connections before described.

A lever 33, which is fulcrumed at one side of the frame, as at 34, Fig. 3, is, in connection with a hand-lever 35, fulcrumed at 36 at the front of the machine, so that the attendant of the machine standing at the front may shift the parts last described at will.

To automatically reverse the front and rear movements of the carrier, I arrange at one side of one of the slides $c\ c'$, preferably the pattern or model carrier slide, a secondary slide 38, (shown more clearly in Figs. 22, 26,) said slide $c'$ being provided with a suitable slideway 38 to receive said secondary slide and retain the same in operative position. Said secondary slide is provided with projections 39 39, Fig. 22, extending into the pathway of the carrier, so as to enter into engagement with the said carrier. When engaged by said carrier in either the forward or rearward movement of said carrier, the secondary slide will be moved longitudinally in its slideway. Said secondary slide is also provided with a downward extension 40, the lower extremity of which is bifurcated, and the prongs 41 of said downward extension lie on opposite sides of a lever 42, lying horizontally beneath the slide $c'$ and having a rock-shaft 43 lying in suitable bearings in the bed-frame. On the outer side of said bed-frame said rock-shaft receives the arm 44 of the lever 42, said arm extending downward into connection with a connecting-rod 45, by which last said lever is connected to a bell-crank lever 46. Said bell-crank lever is in turn connected by a short rod 47 to the shifting lever 50, having an arm 48, by which the clutch sleeve or collar 5 is operated to effect a clutching engagement with one or other of the beveled gear-wheels 3 and 4. The upper arm 51 of the lever 42 extends transversely a distance about equal to the distance of movement of the slide $c'$ on the slideways $b$, and thus the bifurcated extension 40 remains in engagement with said extension notwithstanding the lateral movements of the slide and its carrier.

Above the carriers for the die and pattern the bed-frame $a$ is provided at the sides with vertical slideways 55 55, Fig. 17, on which is arranged a horizontal slide 56, the opposite ends of said slide 56 being suitably formed to engage said slideways and permit vertical adjustment therein and when adjusted maintain great firmness and rigidity when the machine is in operation. When adjusted, the said slide 56 is held in rigid operative position by means of end set-screws 54 54 and screw-shafts 57 57, working in threaded nuts 58, fastened to or arranged beneath the opposite ends of the slide, the said shafts 57 57 and the slide 56 being supported by a cross-bar 59 of the frame having bearings for the said shafts. Above the said cross-bar 59 the shafts 57 are provided with beveled gear-wheels 60 60, which engage correspondingly-beveled gear-wheels 61 61 upon a horizontal crank-shaft 62, the gear-wheels 60 61 at the opposite ends of the cross-bar being of uniform size and the vertical shafts being uniformly threaded, so that when the crank-shaft is turned in the bearings of the bed-frame by means of the handle or crank 62 the said slide 56 will be raised or lowered in its vertical bearings uniformly at opposite ends. Upon the said horizontal slide 56 are arranged two horizontally-adjustable tool-carriers 63 64, one of which provides bearings for the tracer-shaft 65, guiding the same and holding it steady in its independent vertical movements, and the other of which provides bearings for the carving-tool shaft 66 and supports said shaft, raising said shaft when said carrier is raised and falling by gravity with said carving-tool shaft. The said carriers may be horizontally adjustable on the slide 56 by means of the hand of the operator or by mechanical means. Suitable clamping or setting means or set-screws 67 are provided for rigidly holding said carriers into position after they have been properly adjusted. The carriers 63 64 are preferably made in sections, the sections 68 68 in contact with the horizontal slide 56 being provided with vertical slideways on which the second or forward sections 681 are vertically adjustable by means of the hand or by adjusting-screws (not shown) should I desire to employ the same. I prefer, however, for the purposes of this invention to adjust the forward sections by hand, and after adjustment I employ set-screws 69 for fastening the said parts rigidly together. The forward sections 681 are centrally apertured between their upper and lower ends to provide passages for a horizontal lever 70, and above and below the horizontal apertures or passages the said forward sections are provided with boxes or bearings for the shafts 65 66. The carving or die-sinking tool shaft 66 in its carrier-section 681 is held in said carrier-section by the pulley 73, fastened on the upper end of said shaft. The tracer-shaft 65 is held by the lever 70, fulcrumed at one side of the machine, as at 74, and connected by a rod 77 at the opposite end to a hand-lever 75, fulcrumed at 76 upon the bed-frame. The said lever 70 being fulcrumed upon one side of the machine and extending transversely across the said frame and having the two shafts disposed thereon at different distances from the fulcrum, it is evident that the tool and tracer operated by said lever will have different degrees of vertical movements. When the tracer and its shaft 65 is nearer to the fulcrum 74 than the carving-tool 66, the vertical movements of the tracer will be less than the movement of the carving-tool, and thus I secure a greater relief projection of the article reproduced from the pattern. I prefer in ordinary practice, however, to arrange the carving or die-sinking or cutting tool shaft 66 and its carrier or support nearer to the fulcrum than the tracer-shaft 65, so that ordinarily the reproduction will be of a smaller size than the pattern.

To increase or reduce the size of the reproduction to the desired extent and with convenience, I prefer to make the fulcrum 74 of the lever 70 adjustable, and to this end I arrange upon one side of the bed-frame a bracket 78, upon or in which is formed a horizontal slideway 79 to receive the fulcrum-bolt 74, the head 741 of which last is arranged in said slideway 79, as indicated in Fig. 8. The lever 70 adjacent to said slideway is longitudinally slotted, and in the slot 80 of said lever is arranged a sliding bearing-block 81, which is perforated to receive the fulcrum-bolt 74 and a collar 82. Said collar 82 is a little longer than the horizontal thickness of the block 81 to prevent a clamping of the said block by the nut and washer 83 84. By loosening the nut 83 the said fulcrum 74 can be arranged at any suitable point in the slideway by hand or other means, and when said nut is tightened the fulcrum stud or bolt is fixed into position, but the block 81 is permitted to freely turn pivotally with the lever. The carving-tool shaft 66, ordinarily arranged next in order to the fulcrum 74, is connected to the carving-tool-shaft carrier, or at least the front section thereof, as already described, and said carrier is connected to the lever 70, so as to move vertically therewith, the connection being preferably a bolt 841, Fig. 7, which extends through a block 86, adapted to slide in the same slot 80 as that in which the fulcrum-block 81 is arranged, the said block 86 being held in position by a washer 87 and the head of said bolt 841 prevented from being clamped by a collar 89. Thus when the said lever 70 is raised at its free end by the hand-lever 75 or the means hereinafter described the forward section 681 of the carving-tool carrier will also be raised, sliding on the rear section. To render the sliding movements more easy, I have provided a counterbalance-weight 89, arranged on a segmental lever 90, connected to the movable carrier by means of a strap 92 or other suitable connection.

Above and below the lever connection within the recess of the carving-tool carrier the said carrier is provided with boxes or bearings 88 for the carving-tool shaft 66, and by the pulley 73 on the upper end of said shaft above the carrier rotary motion is transmitted to the said carving-tool shaft by means of a suitable belt (not shown) or other means, and below the said carrier at the opposite end of the said shaft is arranged the carving-tool 94, applied in any suitable manner, the said tool being of any construction common in the art of carving metal.

The tracer-shaft 65 is connected with the lever 70 by means of clamping-jaws 96, attached to the lever and adapted to grip the shaft when drawn together by means of a screw 97 or other suitable means, the said jaws 96, Figs. 9, 10, having a sufficient pivotal play upon the said lever to prevent the parts from jamming. The tracer-shaft 65 is moved vertically in its bearings on its carrier 63 by the pattern and other means independent of its said carrier imparting its movement to the lever 70, by which the movement is transmitted to the carving-tool-shaft carrier and shaft.

To partly counterbalance the weight of the tracer-shaft and to secure a very sensitive movement of the tracer over the surfaces of the pattern, I have provided an electromagnet adapted to attract the shaft 65 and raise it from the pattern immediately upon an electric contact of the tracer with said pattern being made and immediately upon the raising of the tracer from the pattern, so as to cause a break in the circuit, to become demagnetized and permit the immediate dropping of the tracer by gravity again into contact with the pattern. I thus secure a constant repetition of contacts and withdrawals of the tracer with and from the pattern, so that the tracer in practice moves over the surfaces of the pattern with great freedom, even though the latter has strong and abrupt projections.

The construction of the electromagnet and its relation to the tracer-shaft will be now more fully described. The magnet is of that type commonly known as "solenoid" and is shown in detail in Figs. 30 and 31. Said solenoid 100 is arranged at the upper end and around the tracer-shaft 65 and is in electric connection with a dynamo-electric machine, (not shown,) with which the wires 101 are in circuit. On the circuit 101 is a circuit changer or breaker 102, comprising an armature-lever 103, fulcrumed upon a suitable bed or support 104, as at 105, and having at its free end a terminal or contact point 106, adapted to engage a terminal or contact point 107 in connection with the circuit-wires 101. Contiguous to said armature-lever 101 is arranged on the bed or support 104 an electromagnet 108 on a supplemental circuit 109, connecting with the metallic surface of the pattern 110, Figs. 30 and 31, and tracer 210 or the shaft 65 thereof. The battery or batteries 111 on the supplemental circuit is of sufficient power to control the operations of the circuit-breaker without danger of burning or otherwise injuring the tracer. The relation of the parts is such as that when the tracing-tool touches the surface of the model the supplemental circuit 109 is closed and the magnet 108 is magnetized, so that it will attract the armature-lever 103, bringing the contact-points 106 107 together and close the circuit 101. By this action the dynamo-electric machine or other generator in turn magnetizes the solenoid 100 and causes it to raise the shaft 65 and its tracer 210 away from contact with the metal surface of the pattern, thus breaking the supplemental circuit by demagnetizing the magnet 108 and permitting the contact-points to separate. The circuit-breaker 102 is furnished with a spring 112, adapted to lift the armature-lever 103 away from contact with the terminal 107 when the supplemental circuit 109 is broken, and thus the main or dynamo circuit 101 is broken, the solenoid is demagnetized, and the tracer-shaft 65 permitted to drop by gravity. These actions are repeated alternately with great rapidity, and in practice the tracer serves to simply glide over the irregular surfaces of the pattern, and because of the quick repeated liftings and gravitations the said tracer is not given a direct horizontal movement against the inclined surfaces of the pattern, which would tend to scratch and damage the pattern, especially if the same were made of a soft pattern metal, an ordinary electrotype of deposited metal, or the like. The pattern is supported on suitable insulation 113.

I may vary the construction of the electric appliances above described to meet special conditions. Instead of a battery for the supplemental circuit I may by the use of a suitable resistance-coil 114, Fig. 32, take the power for magnetizing the circuit-changer magnet 106 directly from the main power-circuit. I may also employ a resistance-coil 115 of any suitable construction to increase or diminish the energy transmitted to the solenoid, any ordinary means being employed in said resistance-coil to effect the desired variation. Again, I may employ any suitable switch 116 to cut off the machine from the main source of electrical energy.

In cases where I desire to reproduce a pattern without changing the proportions thereof I prefer to employ an attachment shown in Figs. 6, 7, 11, 12, 13, 14, 15, 16, where 120 indicates a longitudinally-slotted shaft or bar adapted to be fastened by bolts or other means to the carving-tool-shaft carrier 64, as indicated in Fig. 7, so as to move vertically therewith or so that when said shaft or bar 120 is elevated said carrier will move vertically therewith. Said shaft or bar 120 projects horizontally into the lever-passage of the tracer-carrier 63, where it is slotted longitudinally, as at 121, to form a slideway for a sliding block 122. This said sliding block is centrally perforated to receive an arm 123 of a block 124, adapted to be set upon the shaft 65 by the set-screw 125, as clearly shown in Fig. 7. By this construction the tracer-shaft is directly fastened to the work or carving-tool carrier and its shaft 66, so that both said shafts 65 and 66 operate vertically at uniform speed. When the shaft or bar 120 is in connection as above described, the connection 99 of the shaft 65 (shown in Figs. 9 and 10) with the lever 70 is removed, as will be understood.

While I have employed positive language in describing the machine in its various details of construction, I am very well aware that various modifications may be made in the construction of the device without departing from the spirit or scope of the invention, and therefore I do not wish to be understood as limiting myself by the positive descriptive terms employed, excepting as the state of the art may require.

Having thus described the invention, what I claim as new is—

1. The improved engraving or carving machine, in which is combined a bed-frame having means for supporting the work and pattern, an engraving-tool movable to and from the work, a tracer, a lever connecting the engraving-tool and tracer whereby the latter governs the to-and-fro movements of the engraving-tool, an electromagnetic device adapted to lift the tracer from the pattern to facilitate the passage of the said tracer over the face of the pattern and a circuit for said electromagnetic device including a pattern, for energizing the device and drawing the tracer away from the pattern immediately upon the contacting of the tracer and pattern, substantially as set forth.

2. The improved engraving or carving machine comprising a bed-frame, an engraving-tool movable to and from the work, a tracer governing the movements of said tool, and a solenoid arranged around a part of the tracer and adapted to move said tracer away from the pattern and means for energizing and deënergizing the solenoid, substantially as set forth.

3. The combination of a bed-frame, a tool, a tracer in connection with said tool and governing the movements thereof, said tracer serving as the core of a solenoid, said solenoid being adapted when energized to move said tracer away from a pattern, electrical connections in circuit with said solenoid and with a relay, said relay and a tracer-circuit for governing the relay and effecting quickly repeated changes in the solenoid, substantially as set forth.

4. The combination with a bed-frame and tool and means for operating said tool to secure a performance of effective work, of a tracer governing movements of said tool, a pattern and means for moving said pattern to effect a traversing of said pattern by said tracer, a solenoid acting directly on said tracer to move the same away from the plane of movement of the pattern, and an electric circuit including said solenoid and adapted to be closed upon contact of the tracer with said pattern.

5. The improved machine, in which are combined with supports for the work and pattern, a tool and a tracer movable together, the tracer being the core of the solenoid, and a solenoid and electrical connections controlling the movements of the tracer and tool, substantially as set forth.

6. The combination with a bed-frame, a carrier having thereon an insulated conductor of electricity, a shaft, 65, and its electrically-conductive tracer, adapted to engage the said insulated conductor and means for moving said conductor and changing its relation with respect to the tracer, of an electromagnetic device to draw said shaft away from the conductor when energized, the said conductor being in electric circuit with said electromagnetic device, an electrically-conductive tracer and the circuit of the electromagnetic device being closed when the said electrically-conductive tracer is in contact with the said conductor, substantially as set forth.

7. The combination with the bed-frame, of an engraving-tool and means for operating said tool, means for moving the work beneath the said tool, a tracer governing the movements of said tool, a magnetic device, adapted to raise the tracer away from its pattern when energized, an electric circuit for said magnetic device, an electrically-conductive pattern in circuit with the tracer, and a relay in circuit with said pattern and controlling the magnetic device, all arranged and adapted to operate, substantially as set forth.

8. In a carving or engraving machine, a rotary carving or engraving tool, a tracer, a lever supporting the engraving or carving tool and connected with the tracer, means for rotating said carving or engraving tool and means to cause the said tool and tracer to traverse the faces of the work and pattern respectively, an electromagnetic device to attract the tracer when energized and draw said tracer and carving-tool in a direction away from the pattern and work, an electrical circuit in connection with said electromagnetic device and means for opening said circuit immediately upon the contacting of the tracer with the pattern, all said parts being arranged and combined, substantially as set forth.

9. In a carving or engraving machine, the combination of a frame having a support for independently-movable shaft-carriers, said support providing horizontal slideways permitting horizontal movements of the said carriers, the shafts having bearings in said carriers, said carriers being in sections and the sections having the shafts being vertically movable on the other sections of said carriers on the slideways, a lever in connection with said shafts, said lever being fulcrumed on bearings carried by the frame at or near one side of said frame, distant from said carriers, whereby the said shafts may be given regularly-proportioned differential movements, a carving or engraving tool and tracing-point arranged in said shafts, means for rotating the carving-tool shaft and means for automatically and intermittingly raising the tracer-shaft to disengage the tracing-point from the pattern to facilitate a traversing of the surface of the pattern by said tracing-point, substantially as set forth.

10. In a carving or engraving machine, the combination of a rotary carving or engraving tool, a tracer, a supporting-lever connected to said carving-tool and tracer at different distances from the fulcrum of said lever, means for causing the work and pattern to move simultaneously beneath said tool and tracer, means for rotating the carving or engraving tool, an electromagnetic device for imparting quick reciprocating vertical movements to the tracer as it moves over the surface of the pattern, the vertical movements of the tracer being positively transmitted to the carving-tool, substantially as set forth.

11. In a carving or engraving machine, the combination with a frame having at its upper part a horizontal slideway, of two sectional carriers arranged independently and adjustably upon said slideway, one section of each of said carriers having a vertical slideway and the other section of each of said carriers being vertically movable on the first said section and each of the vertically-movable sections having a shaft-bearing and a shaft therein, a tracer in connection with one of said shafts, a carving or engraving tool in connection with the other of said shafts, a lever fulcrumed at a distance from said carriers and transmitting motion from the tracer-shaft to the vertically-movable section of the tool-shaft carrier, an electromagnetic device, adapted to repeatedly raise the tracer from the pattern, electric-circuit connections and means for opening and closing the circuit and energizing the electromagnetic device and means for moving the work and pattern, substantially as set forth.

12. In an engraving or carving machine, the combination of a carving-tool, a tracer connected to and governing the vertical movements of the carving-tool, a solenoid for attracting said tracer and raising it from the pattern against the force of gravity, an electric circuit including said solenoid and being adapted to be closed upon contact of the tracer with the pattern, means for rotating the carving-tool, a pattern-carrier, an independent work-carrier, pairs of screw-shafts and connections for operating the work-carrier and pattern-carrier simultaneously in two directions, the shafts of one pair lying at right angles to the shafts of the other pair, and a common source of power for turning said pairs of screw-shafts simultaneously, substantially as set forth.

13. In an engraving or carving machine, the combination of a carving or engraving tool, a tracer connected to and governing the vertical movements of said carving or engraving tool, a solenoid stationed in the line of said tracer to attract the same and impart longitudinal movement to said tracer when said solenoid is energized, an electric circuit in connection with the solenoid for energizing the tracer-solenoid, a work-carrier arranged beneath the tool, an electrically-insulated carrier for the pattern, a pattern having a conductive surface in said electric circuit, means for moving said pattern both laterally and longitudinally in or on the frame, and operating means, substantially as set forth.

14. In an engraving or carving machine, the combination with the frame, of a rotary carving-tool movable longitudinally in the direction of its axis while rotating, a tracer connected with said carving-tool and imparting longitudinal movement thereto, a solenoid arranged around the upper edge of the tracer and adapted to lift said tracer away from the pattern when energized, an electric circuit adapted to energize said solenoid, a circuit-breaker adapted to open the circuit of the tracer-solenoid immediately upon an engagement of the tracing-tool with its pattern, means for operating the said circuit-breaker and opening said circuit when said tracer contacts with the pattern, and pattern and work moving means and rotary tool-operating means, substantially as set forth.

15. In an engraving or carving machine, the combination with a frame or bed having parallel horizontal slideways, parallel slides arranged on said slideways and having slideways at the top, carriers arranged on said parallel slides, screws having bearings in said slides and said carriers and adapted, when rotated, to effect a movement of said carriers on said slides, said screw-shafts having at one end sprocket-wheels and arms 22, supporting idle sprocket-wheel shafts, idle sprocket-wheels on the last said shafts, and an endless-chain connection extending over said idle sprocket-wheels and the sprocket-wheels of the slides, substantially as set forth.

16. In an engraving or carving machine, the combination with a frame or bed having parallel horizontal slideways, of parallel slides arranged on said slideways and having other slideways, carriers arranged on the second slideways, pairs of screw-shafts, the sections or members of each pair of which have different-sized threads, the smaller threads engaging one of said slides and the larger threads the other said slide, means for rotating said shafts, differently-threaded screw-shafts having bearings in said slides and movable therewith, carriers supported by said slides and movable therewith and engaging the last-mentioned screw-shafts, and being moved on the slides thereby, sprocket-wheels arranged on said last-mentioned screw-shafts, and connecting-chains arranged to transmit motion from one of said last-mentioned screw-shafts to the other and permit the differential movements of said slides, and operating means, substantially as set forth.

17. In a carving-machine, the combination with the bed-frame, of carriers 63, 64, each having bearings for a shaft, a lever fulcrumed at one side of said bed-frame and supporting one of said carriers and its shaft and also directly supporting the other shaft, whereby when the lever is moved on its fulcrum, it will operate one of the shafts with its carrier and the other shaft independent of its carrier, substantially as set forth.

18. The combination with the bed-frame of a carving-machine, having the vertically-adjustable slide 56, of carriers independently adjustable horizontally thereon, a rotary carving-tool shaft and a tracing-tool shaft each having a bearing in one of said carriers, a lever 70, arranged on an adjustable fulcrum at one side of the frame, and connections of the lever with one of said carriers and with one of said shafts, substantially as set forth.

19. In a carving-machine, the combination with the bed-frame having a slide 56, sectional carriers adjustably secured on said slide, the secured sections of said carriers having vertical slideways on which the vertically-sliding sections of said carriers are arranged, a lever extending transversely through said sliding sections of said carriers, means for connecting one of said sliding carrier-sections to said lever, shafts having bearings in the said carriers and means for connecting one of said shafts to said lever, substantially as set forth.

20. In a carving-machine, the combination with the carriers 63 and 64, with their shafts and tools, of a lever fulcrumed at one side of said carriers and extending transversely across the vertical axes of said shafts, as viewed from the front, a connection of one of said carriers with said lever and interchangeable connections whereby the shaft of the other carrier may either be attached to the first carrier, or to the said lever, substantially as set forth.

21. In a carving-machine, the combination with the carriers 63 and 64, with their shafts and tools, of a lever fulcrumed at one side of said carriers and transversely extending across the vertical axes of said shafts as viewed from the front, a connection of one of said carriers with said lever, and a separable clamp connecting said lever with the shaft of the other carrier, substantially as set forth.

22. In a carving-machine, the combination of the sectional carriers 63 and 64, adjustable horizontally with relation to one another, one of the sections of each of the carriers being provided with vertical slideways for the forward section thereof, vertical shafts having bearings in said forward sections, one of said shafts being movable vertically with its carrier-section and the other of said shafts being vertically movable independently of its carrier-section, means for rotating the first said shaft in its bearings of the forward carrier-section, a lever fulcrumed independently of either of said carrier-sections, connections of said lever with the carrier-section movable vertically with its shafts and connections of said lever with the shaft movable vertically independent of its carrier-section, substantially as set forth.

23. In a carving-machine, the combination with the frame $a$, having the vertical slideways at the opposite sides, an adjustable horizontal slide supported in said slideways, sectional carriers adjustably arranged on said slide, one of the sections of each of which said carriers is provided with a vertical slideway to receive the forward sections of said carriers, a tracer-shaft having bearings in one of the forward sections of said carriers and being vertically movable in said bearings independent of the carrier, a tracing-point at the lower end of said shaft, a work or die-sinking tool shaft arranged in the forward section of the other carrier and movable vertically with its forward section, a working or die sinking or cutting tool at the lower end of the last said shaft, means for rotating the last-mentioned shaft in its bearings, a lever extending approximately horizontally toward said carriers, connections of said lever and carving-tool-shaft carrier, and connections of said lever and tracer-shaft, arranged and adapted to operate, substantially as set forth.

24. In a carving-machine, the combination with the frame, a carving-tool, a tracer, connections of said tracer and carving-tool, and operating means, of a horizontally-movable pattern-carrier $f$, arranged on the longitudinal slideway of a laterally-movable slide, a screw-shaft having bearings on said slide and adapted to rotate and effect a longitudinal movement of the carrier on said slide, a secondary slide arranged in a longitudinal slideway of the first said slide, said secondary slide having arms or projections to engage a lever, said lever fulcrumed upon the frame, connection of said lever with a shifter and operating means adapted to be reversed in effective movement by said shifter, substantially as set forth.

25. The combination in a carving-machine, of slides $c$ $c'$, screw-shafts 10, 14, carriers $e$, $f$, connections 15, 17, 19, of said screw-shafts, pairs $h$, $i$, of screw-shafts, sprocket wheel and chain connections of said screw-shafts $h$, $i$, lying opposite one another lengthwise of the machine, shafts $n$, 2, connections of one of said shafts with the screw-shafts 10, gear-wheels, clutch-collars adapted to clutch with said gear-wheels to secure reverse movements, and means for operating said shafts and connections, substantially as set forth.

26. In a carving-machine, the combination with the frame $a$, of a work-carrier slide, an independent pattern-carrier slide, screw-shafts 10, 14, arranged on said slides, carriers $e$, $f$, adapted to slide on said slides, a supplemental slide arranged on the pattern-carrier slide and having arms or projections 39, 39, and an extension or projection 40, a train of levers and connections connecting with reverse mechanisms whereby the movements of the slides are changed, screw-shafts $h$, $i$, permitting independent movements to the slides, sprocket wheel and chain connections of the shafts $n$ 2, and means for transmitting and reversing movements, substantially as set forth.

27. In a carving-machine, the combination with the frame-slide $c'$, of means for moving the same transversely on said frame, a carrier movable longitudinally on said slide and means for moving said carrier longitudinally, and a supplemental slide having extensions or projections 39, and 40, the latter being forked to slide on an arm of a lever 42, and motion-reversing means in connection with said lever and operating means, all arranged and combined, substantially as set forth.

28. In a carving-machine, the combination with the frame, of a pattern-holding slide $c'$, means for moving said slide transversely on said frame, a carrier and means for moving said carrier longitudinally on said slide, a supplemental slide arranged on said slide $c'$, and having projections 39, adapted to be engaged by the carrier whereby the supplemental slide is moved on said slide $c'$, said supplemental slide having an extension 40, engaging a train of means in connection with movement-reversing means in connection with the said means for moving the carrier longitudinally upon the slide $c'$, and said movement-reversing means, all arranged and combined, substantially as set forth.

29. In a carving-machine, the combination with the frame, of slides, carriers movable on said slides, means for sliding the slides, screw-shafts for sliding the carriers on said slides, sprocket-wheels on said screw-shafts, arms 22, extending up and down from said screw-shafts and connected above and below the horizontal plane of said screw-shafts by idle sprocket-wheel shafts, said idle sprocket-wheel shafts and idle sprocket-wheels thereon and a chain and operating means, substantially as set forth.

30. In a carving-machine, the combination with the slides, carriers and screw-shafts and connections for operating said parts, of a shaft $n$, arranged at the rear of said machine having beveled gear-wheels $q$, $q$, and clutch for engaging said beveled gear-wheels alternately, means for shifting said clutch, a shaft 2, arranged at the front of the machine and having similar beveled gear-wheels, clutch and clutch-shifting means, and a shaft $s$, having at opposite ends beveled gear-wheels engaging the beveled gear-wheels of the shafts $n$, 2, and means for rotating said shaft $s$, substantially as set forth.

31. In a carving-machine, the combination with the slides, carriers and screw-shafts having sprocket-wheels, of the pulley $w$, shaft $v$, having worm-wheel $u$, a shaft $s$, having an engaging worm-wheel $t$, and at its opposite ends gear-wheels $r$, 6, shafts $n$, 2, having beveled gear-wheels $q$, $q$, 3, 4, and sliding clutch means to alternately engage said wheels $q$, $q$, 3, 4, and reverse the movements of the shafts $n$, 2, and means for transmitting movement from the shafts $n$, 2, to the screw-shafts to secure movements of the slides and carriers, substantially as set forth.

32. In a carving-machine, the combination with the slides and carriers, of a shaft $s$, and means for rotating the same, beveled gear-wheels $r$, 6, beveled gear-wheels $q$, $q$, 3, 4, shafts $n$, 2, carrying said gear-wheels $q$, $q$, 3, 4, clutch collars or sleeves arranged on said shafts $n$, 2, between said gear-wheels $q$, $q$, 3, 4, and alternately engaging the same to secure reverse movement and means connecting said shafts to said slides and carriers, and moving the slides transversely and the carriers both transversely and longitudinally on the machine, substantially as set forth.

In testimony that I claim the foregoing I have hereunto set my hand this 2d day of October, 1899.

HONESTUS M. ALBEE.

Witnesses:
CHARLES H. PELL,
DON A. ALBEE.